(12) United States Patent
Gallon et al.

(10) Patent No.: US 7,159,461 B2
(45) Date of Patent: Jan. 9, 2007

(54) VIBRATING RATE GYRO WITH SLAVING OF DETECTION FREQUENCY TO EXCITATION FREQUENCY

(75) Inventors: Pierre Gallon, Vouneuil sur Vienne (FR); Bernard Chaumet, Chatellerault (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/539,766

(22) PCT Filed: Dec. 18, 2003

(86) PCT No.: PCT/EP03/51053

§ 371 (c)(1),
(2), (4) Date: Jun. 20, 2005

(87) PCT Pub. No.: WO2004/057270

PCT Pub. Date: Jul. 8, 2004

(65) Prior Publication Data

US 2006/0117849 A1 Jun. 8, 2006

(30) Foreign Application Priority Data

Dec. 20, 2002 (FR) .................................. 02 16365

(51) Int. Cl.
*G01C 19/00* (2006.01)
*G01P 9/00* (2006.01)

(52) U.S. Cl. ................................. 73/504.12; 73/504.04

(58) Field of Classification Search ............. 73/504.04, 73/504.12, 504.02, 504.14, 504.15, 504.16, 73/504.11, 504.13

See application file for complete search history.

(56) References Cited

U.S. PATENT DOCUMENTS

| 5,747,690 A | 5/1998 | Lee et al. |
| 5,992,233 A | 11/1999 | Clark |
| 6,253,612 B1 | 7/2001 | Juneau et al. |
| 6,508,122 B1 * | 1/2003 | McCall et al. ........... 73/504.12 |
| 6,805,007 B1 * | 10/2004 | Fell et al. ................ 73/504.12 |
| 7,040,162 B1 * | 5/2006 | Lehureau et al. ........ 73/504.12 |

FOREIGN PATENT DOCUMENTS

| EP | 0 642 216 A | 3/1995 |
| WO | 98/15799 A | 4/1998 |

OTHER PUBLICATIONS

Mochida Y et al: "A micromachined vibrating rate gyroscope with independent beams for the drive and detection modes". Micro Electro Mechanical Systems, 1999 MEMS '99 Twelfth IEEE International Conference On Orlando FL, USA Jan. 17, 1999, pp. 618-623

* cited by examiner

*Primary Examiner*—Helen Kwok
(74) *Attorney, Agent, or Firm*—Lowe Hauptman & Berner, LLP

(57) ABSTRACT

The invention relates to a gyroscope comprising at least one mass capable of vibrating along an x axis at a resonant excitation frequency $F_x$ capable of vibrating along a y axis perpendicular to the x axis, at a resonant detection frequency $F_y$, under the effect of a Coriolis force generated by a rotation about a z axis perpendicular to the x and y axes. It includes, connected to the mass or masses, a feedback control loop for controlling the resonant frequency $F_y$ so that $F_y$ is equal or practically equal to $F_x$ throughout the duration of use of the gyroscope.

17 Claims, 6 Drawing Sheets

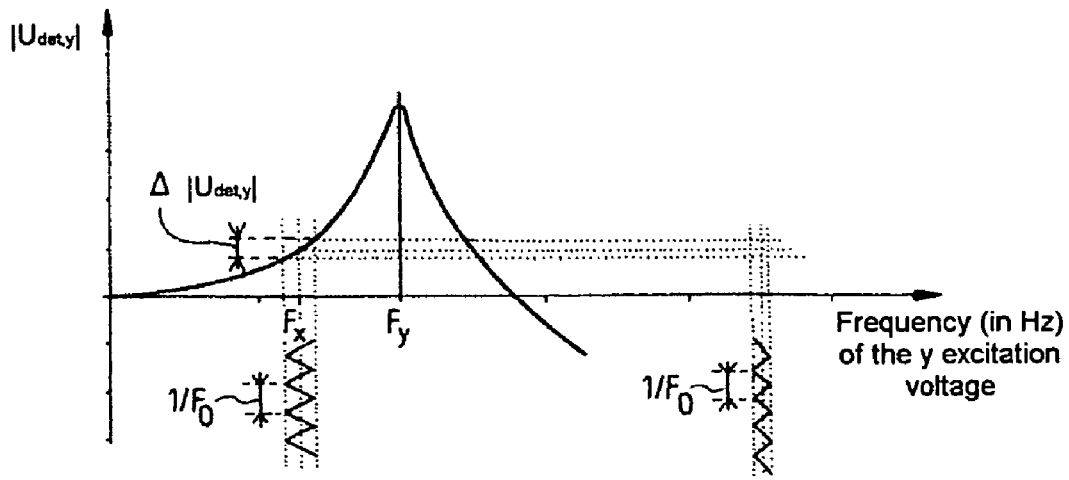
FIG.5a): $F_y > F_x$
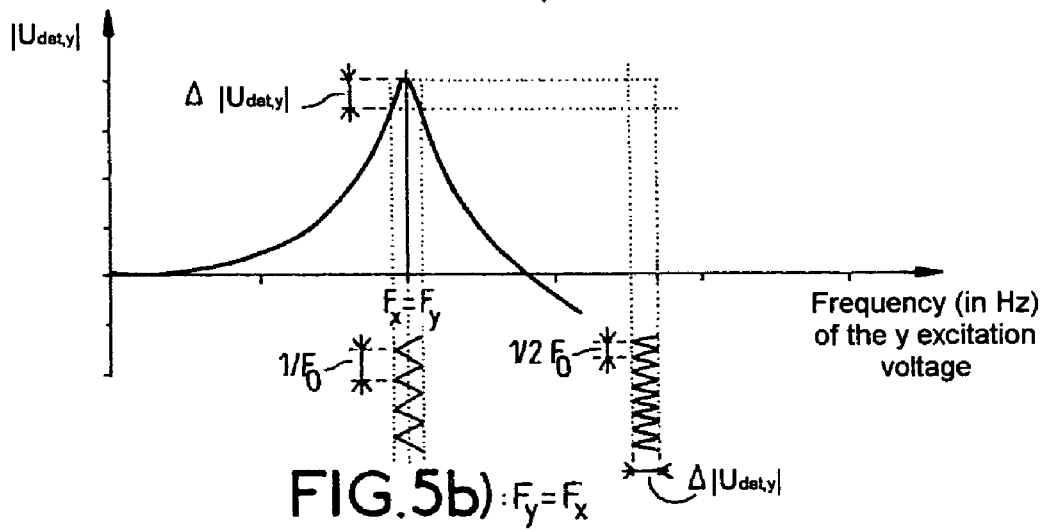
FIG.5b): $F_y = F_x$
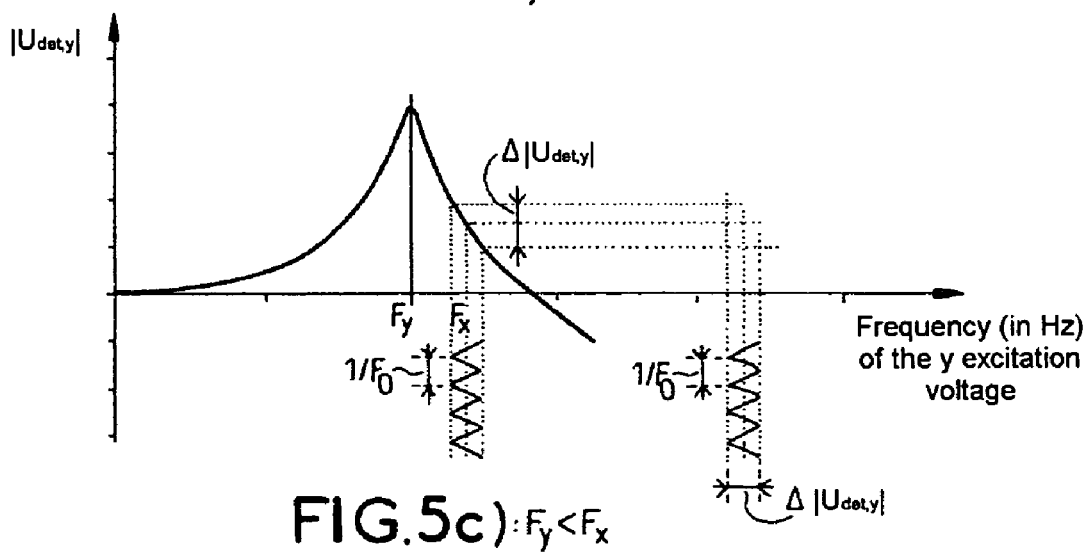
FIG.5c): $F_y < F_x$

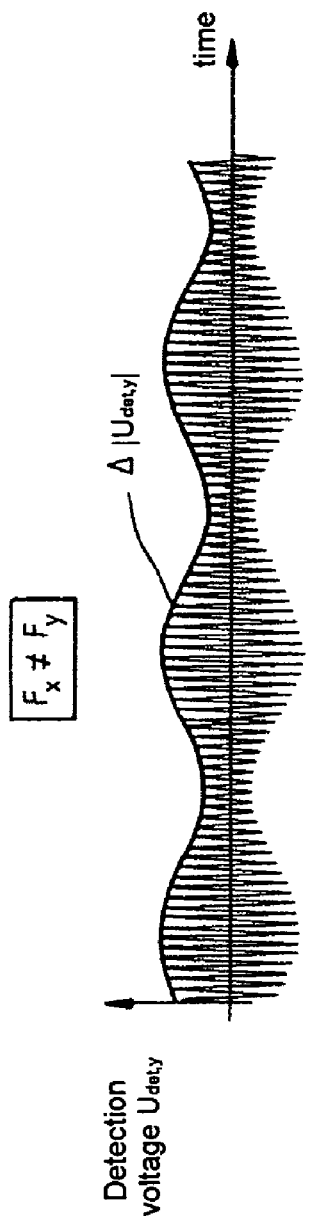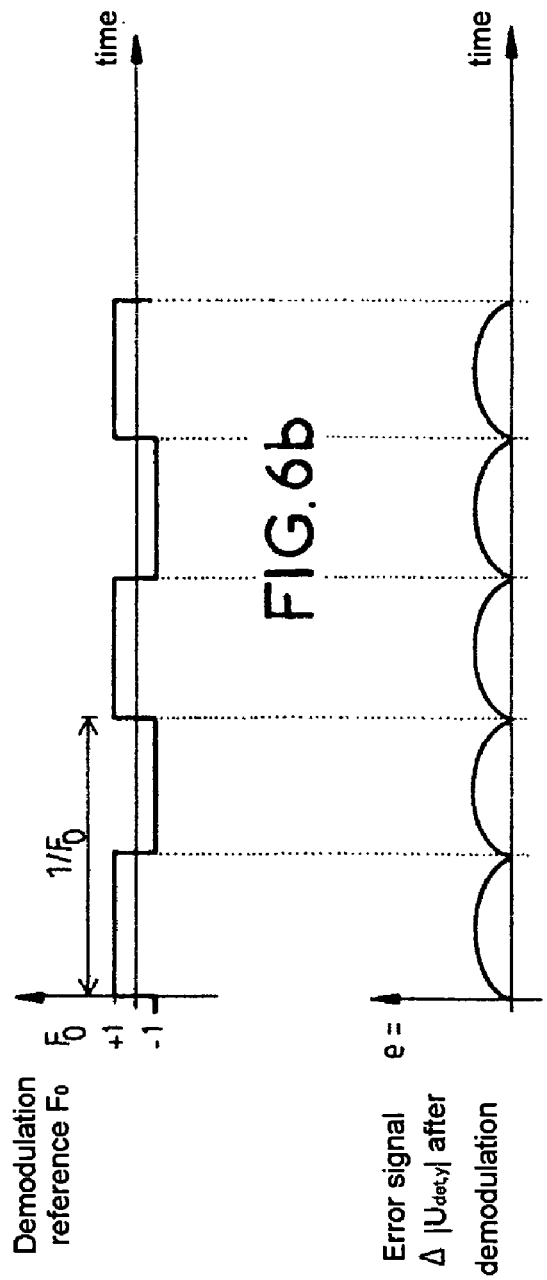

VIBRATING RATE GYRO WITH SLAVING OF DETECTION FREQUENCY TO EXCITATION FREQUENCY

CROSS-REFERENCE TO RELATED APPLICATIONS

The present Application is based on International Application No. PCT/EP2003/051053, filed on Dec. 18, 2003, which in turn corresponds to FR 02/16365 filed on Dec. 20, 2002, and priority is hereby claimed under 35 U.S.C §119 based on these applications. Each of these applications are hereby incorporated by reference in their entirety into the present application.

FIELD OF THE INVENTION

The invention relates to a vibrating gyroscope.

BACKGROUND OF THE INVENTION

The operating principle of a vibrating gyroscope is explained in relation to FIG. 1.

A mass M is suspended from a rigid frame C by means of two springs, of stiffness $K_x$ and $K_y$. It therefore possesses two degrees of freedom, along the x and y directions.

The system may be considered as an assembly of two resonators having eigenfrequencies or natural frequencies $F_x$ along x and $F_y$ along y.

The mass M is excited at its natural frequency $F_x$ along the x axis.

When a speed of rotation $\Omega$ about the third, z axis is present, the Coriolis forces induce coupling between the two resonators, causing the mass to vibrate along the y axis.

The amplitude of the movement along y is then proportional to the speed of rotation $\Omega$.

This amplitude is also a function of the difference in the natural frequencies $F_x$ and $F_y$—maximum sensitivity is achieved when the two natural frequencies are equal.

In particular, for high-performance gyroscopes, it is necessary to obtain maximum sensitivity of the displacement relative to the speed of rotation. It is therefore very desirable to make these frequencies equal.

However, when the frequency equality condition is met, the bandwidth of the gyroscope becomes very small. To increase it, the detection movement along y is feedback controlled, by applying an electrostatic or electromagnetic force along the y axis to the mass, which force counterbalances the force created by the Coriolis coupling. There is no longer any vibration of the mass along y and it is then the feedback force proportional to the speed of rotation $\Omega$ that is measured.

It is therefore desirable in vibrating gyroscopes of higher performance for the movement along the y axis to be feedback controlled and for the frequencies $F_x$ and $F_y$ to be made coincident.

However, the dispersion due to the method of production in manufacture does not allow a perfectly zero frequency difference to be obtained. It is therefore necessary to make an adjustment in order for the two frequencies to be equal.

A first method consists in making these frequencies equal by mechanical balancing. This therefore involves modifying the mass or stiffness characteristics of one or other of the resonators by removing material. This method may be used for carrying out a coarse initial adjustment of the frequencies.

Another method consists in carrying out electrical balancing. By means of electrodes, a variable electrostatic (or electromagnetic) stiffness is added to one of the two resonators so as to vary its natural frequency. This method allows a very fine initial adjustment of the frequencies to be made using an electrical voltage applied to the electrodes.

If a gyroscope whose frequencies have been initially adjusted by one of these methods is used, the initial adjustment of making the mechanical resonant frequencies $F_x$ and $F_y$ coincide cannot be maintained in the long term and under all environmental conditions.

This is because parasitic mechanical effects and the thermoelasticity effects are not strictly identical in both resonators and these effects may result in a frequency differentiation when the environmental, both mechanical and thermal, conditions vary.

One important object of the invention is therefore to propose a vibrating gyroscope that allows the initial adjustment of making the mechanical resonant frequencies $F_x$ and $F_y$ coincident able to be maintained in the long term and under all environmental conditions.

SUMMARY OF THE INVENTION

To achieve this object, the invention proposes a gyroscope comprising at least one mass M capable of vibrating along an x axis at a resonant excitation frequency $F_x$ and capable of vibrating along a y axis perpendicular to the x axis, at a resonant detection frequency $F_y$, under the effect of a Coriolis force generated by a rotation about a z axis perpendicular to the x and y axes, mainly characterized in that it comprises, connected to the mass or masses M, a feedback control loop for controlling the resonant frequency $F_y$ so that $F_y$ is equal or practically equal to $F_x$ throughout the duration of use of the gyroscope.

This feedback control loop thus makes it possible for the stiffness $K_y$ to be permanently feedback-controlled so as to make the natural frequencies $F_x$ and $F_y$ along the two directions equal.

According to one feature of the invention, the gyroscope includes a signal generator for generating a signal that disturbs the vibration of the mass M along y, said generator being connected to the mass M, and the feedback control loop comprises: means for modifying the resonant detection frequency $F_y$, means for detecting the variation, induced by the disturbing signal, in the vibration of the mass M along y, an error signal representative of the difference between $F_x$ and $F_y$ being deduced from this variation, and control means for controlling the $F_y$-modifying means, the control being established on the basis of the error signal.

According to a first embodiment of the invention, the disturbing-signal generator is connected to the mass M via the $F_y$-modifying means.

According to another embodiment, when the gyroscope includes excitation means for exciting the mass M along y with the aim of counterbalancing the vibration along y generated by the Coriolis force, the disturbing-signal generator is connected to the mass M via these excitation means.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

Accordingly, the drawings and description thereof are to be regarded as illustrative in nature, and not as restrictive.

BRIEF DESCRIPTION OF THE DRAWINGS

Other features and advantages of the invention will become apparent on reading the following detailed description, given by way of nonlimiting example and with reference to the appended drawings in which:

FIGS. 5a), 5b) and 5c) show schematically, according to whether $F_y > F_x$, $F_y = F_x$ or $F_y < F_x$, the curves corresponding to those of FIGS. 3 and 4a) and also the corresponding variation of the amplitude of the detection signal $\Delta|U_{det,y}|$;

FIG. 6a) shows schematically the detection signal $U_{det,y}$, the envelope of which is given by $\Delta|U_{det,y}|$ for the case in which $F_x \neq F_y$; shown respectively in FIGS. 6b) and 6c) are a reference demodulation signal of frequency $F_0$ and an error signal e;

DETAILED DESCRIPTION OF THE INVENTION

High-precision vibrating gyroscopes generally have two symmetrical vibrating masses operating in what is called tuning-fork mode.

In micromachined sensors, the excitation movement is generally provided by electrostatic forces along the x direction. These forces are often created by means of electrostatic combs.

The detection movement is picked up along a y direction perpendicular to x. In the case of micromachined sensors produced in a plane structure, this y direction may, depending on the case, lie in the plane of the plane structure or perpendicular to this plane.

Figure 1:
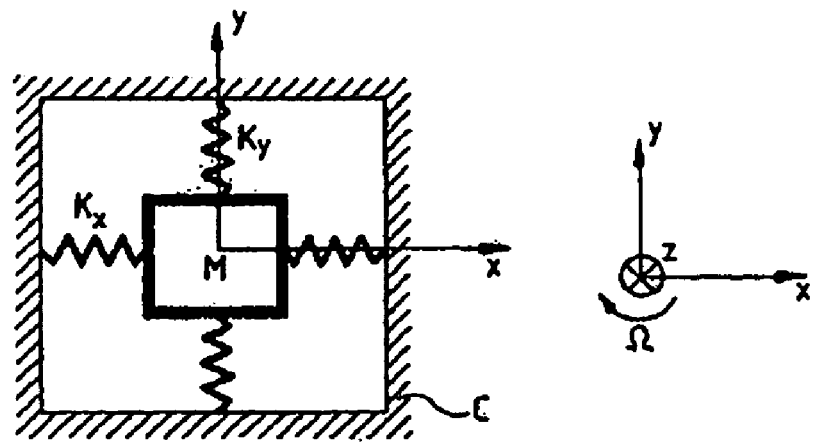
FIG. 1 illustrates schematically the operating principle of a vibrating gyroscope.
Figure 2:
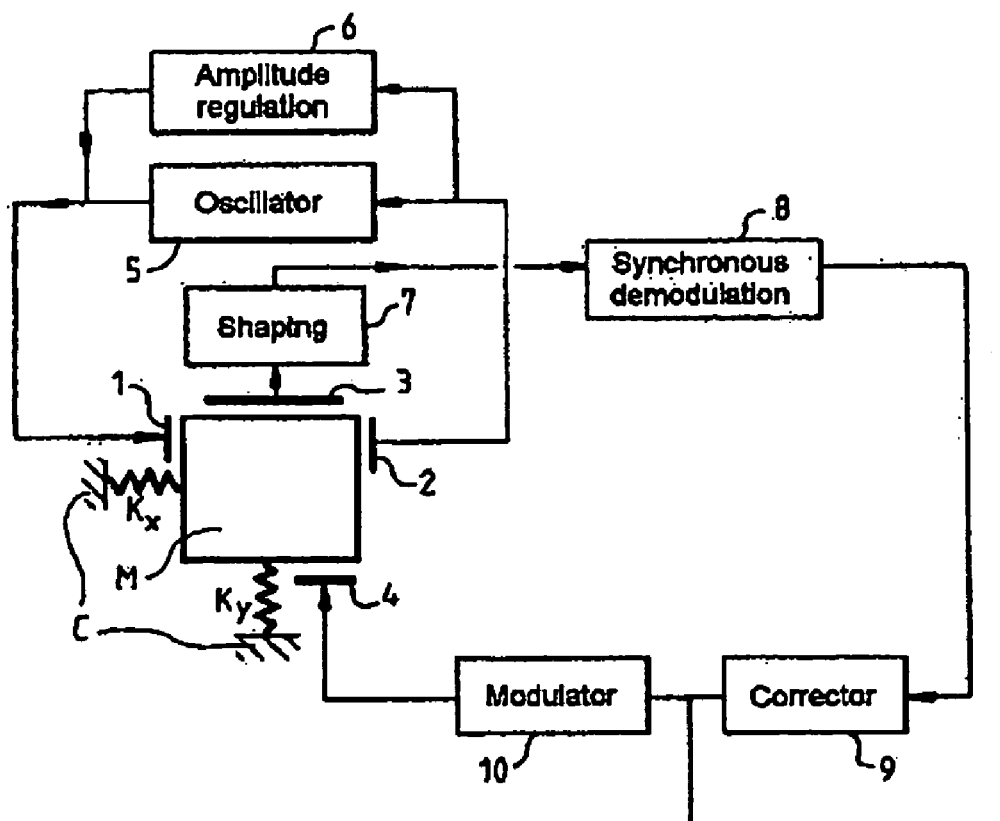
FIG. 2 shows schematically the necessary main components relating to a single mass of a gyroscope according to the prior art.

FIG. 2 shows the necessary main components relating to a single mass, for the sake of simplicity.

Conventionally, means are provided:

for applying excitation forces along the x direction and for detecting the movement of the masses along x so as to feedback control these excitation forces;

for detecting the movement of the masses along the y direction; and for applying feedback forces to the masses along y, these forces being intended to counterbalance the forces created by the Coriolis coupling along y.

These means generally consist of sets of electrodes. The x and y resonators therefore have various types of electrodes:

excitation electrodes 1, for applying an excitation force along x proportional to a control voltage $U_{ex,x}$, and detection electrodes 2 that deliver a detection voltage $U_{det,x}$ proportional to the movement along x;

detection electrodes 3 that deliver a detection voltage $U_{det,y}$ proportional to the movement along y; and feedback electrodes 4 which are in fact excitation electrodes for applying a feedback force to the y resonator proportional to a control voltage $U_{ex,y}$.

The means 2 for detecting the movement of the mass along x are connected to the means 1 for applying excitation forces along the x direction via an oscillator 5 and an amplitude regulation device 6 placed in parallel with the oscillator 5.

An excitation or feedback loop for excitation along y comprises the following elements. The means 3 for detecting the movement of the mass along y are connected to the means 4 for applying feedback forces along the y direction by a shaping device 7, in series with a synchronous demodulator 8, a corrector 9 and then a modulator 10. The output signal from the gyroscope comes from the corrector 9.

The object of the invention is to provide permanent feedback control of $F_y$, for example by controlling the stiffness $K_y$, so as to make the natural frequencies $F_y$ and $F_x$ equal. To do this, a feedback control loop is proposed, which includes $F_y$-modifying means 11 (shown in FIGS. 7 and 8) such as, for example, electrodes for controlling the stiffness $K_y$, which are controlled on the basis of an error signal representative of the difference between $F_x$ and $F_y$. The error signal is determined as follows.

Figure 3:
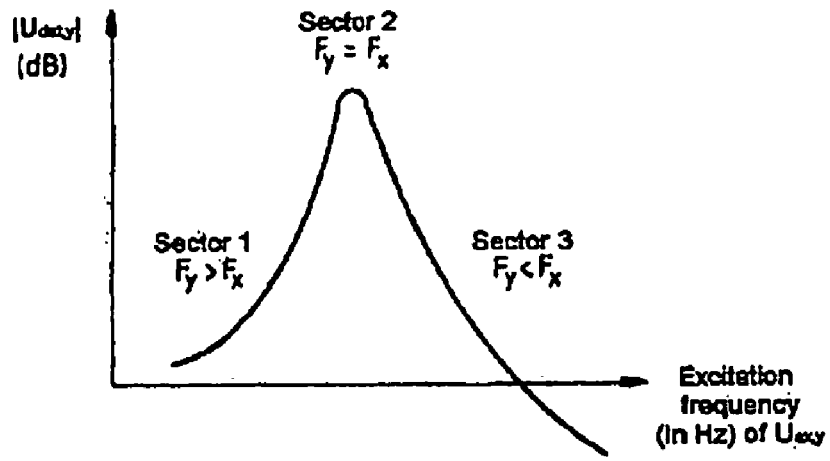
FIG. 3 shows schematically a curve representative of the variation of the amplitude (in dB) of the detection signal $|U_{det,y}|$, corresponding to the movement of the mass along y, as a function of the frequency in Hz of the excitation signal $U_{ex,y}$ according to the prior art.

FIG. 3 shows schematically a curve representative of the variation of the amplitude (in dB) of the signal $|U_{det,y}|$ coming from the electrodes for detecting the movement of the mass along y, as a function of the frequency in Hz of the excitation signal $U_{ex,y}$ applied to the excitation electrodes. This curve shows a maximum when $F_x = F_y$ and decreases otherwise.

By disturbing the frequency of the excitation signal $U_{ex,y}$, that is to say by applying a disturbing force along $O_y$ to the mass, a disturbance of the detection signal, corresponding to the movement of the mass along y, is obtained, this disturbance being representative of the error signal.

The disturbing force is generated by applying, to the y excitation electrode 4, a disturbing voltage $U_{ex,y}$ frequency-modulated about the central frequency $F_x$ at the frequency $F_0$ of the following form:

$$U_{ex,y} = U_{ex,0} \sin(2\pi(F_x + \Delta F \sin(2\pi F_0 t))t),$$

$U_{ex,0}$ being a constant.

Figure 4:
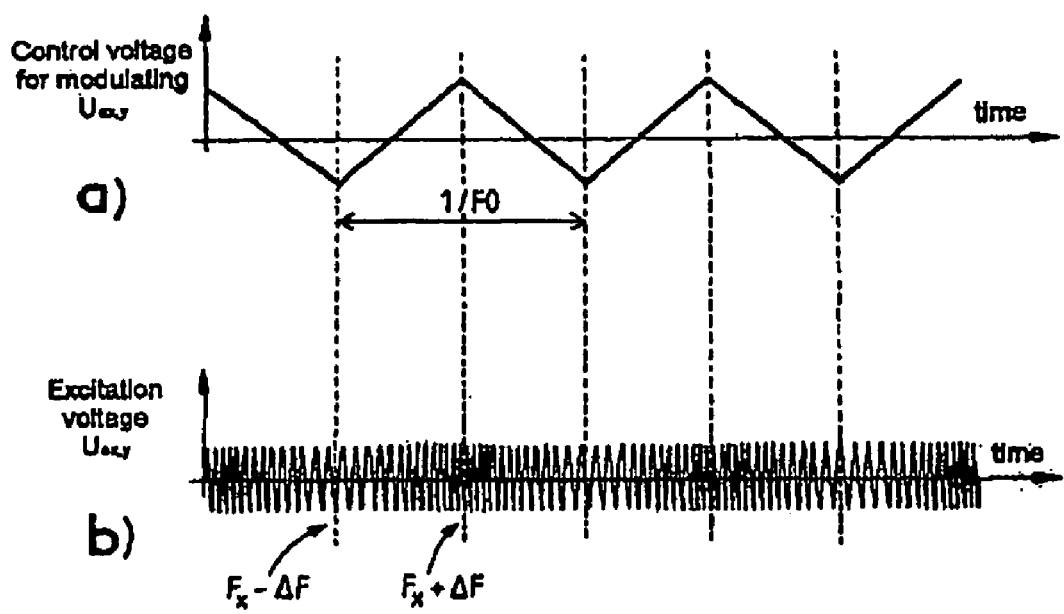
FIGS. 4a) and b) show schematically the curves representative of the control signal (in this case a voltage) for controlling the frequency modulation (FIG. 4a) and of the perturbing signal $U_{ex,y}$ frequency-modulated about the central frequency $F_x$ at the frequency $F_0$ (FIG. 4b), expressed as a function of time.

$U_{ex,y}$ is shown in FIG. 4b) and obtained by applying, to an oscillator, a signal (in this case a voltage) for controlling the frequency modulation shown in FIG. 4a).

FIG. 4b) indicates certain frequencies of $U_{ex,y}$.

In practice, the frequency modulation is not necessarily sinusoidal, but triangular. $F_0$ is chosen to be above the bandwidth of the gyroscope, but very much below $F_x$. For example, $\Delta F$ is about 10% of $F_x$.

Depending on whether the resonant frequency $F_y$ is below, equal to or above the excitation frequency $F_x$, the variations in the amplitude of the detection signal $|U_{det,y}|$ will be different:

if $F_y > F_x$, $\Delta|U_{det,y}| = u \sin(2\pi F_0 t)$ (sector 1, shown in FIG. 5a)

if $F_y=F_x$, $\Delta|U_{det,y}|=u\sin(4\pi F_0 t)$ (sector 2, shown in FIG. 5b)

if $F_y<F_x$, $\Delta|U_{det,y}|=-u\sin(2\pi F_0 t)$ (sector 3, shown in FIG. 5c).

These variations in the amplitude of the detection signal $|U_{det,y}|$ are thus representative of the difference in $F_x$ and $F_y$: the error signal e is deduced from this difference.

Depending on the sector in question, the amplitude of the error signal is a signal of frequency $F_0$ in phase with the control signal (sector 1) or in phase opposition (sector 3) or a signal of frequency $2F_0$ (sector 2).

These three situations are illustrated in FIGS. 5a), 5b) and 5c), respectively. Each case shows the same curve as that in FIG. 3 and the variation in the signal for controlling the frequency modulation of $U_{ex,y}$ as shown in FIG. 4a), and the corresponding variation in the amplitude of the detection signal $\Delta|U_{det,y}|$ from which the error signal e is deduced.

In the case of FIG. 5a) where $F_x<F_y$, $\Delta|U_{det,y}|$ is a signal of frequency $F_0$ in phase with the control signal.

In the case of FIG. 5b) where $F_x=F_y$, $\Delta|U_{det,y}|$ is a signal of frequency $2F_0$.

In the case of FIG. 5c) where $F_x>F_y$, $\Delta|U_{det,y}|$ is a signal of frequency $F_0$ in phase opposition with the control signal.

FIG. 6a) shows the detection signal $U_{det,y}$, the envelope of which is shown as $\Delta|U_{det,y}|$ in the case of which $F_x \neq F_y$. A demodulation reference signal of frequency $F_0$ and the error signal e coming from the synchronous demodulation device 15 are shown in FIGS. 6b) and 6c) respectively.

Figure 7:
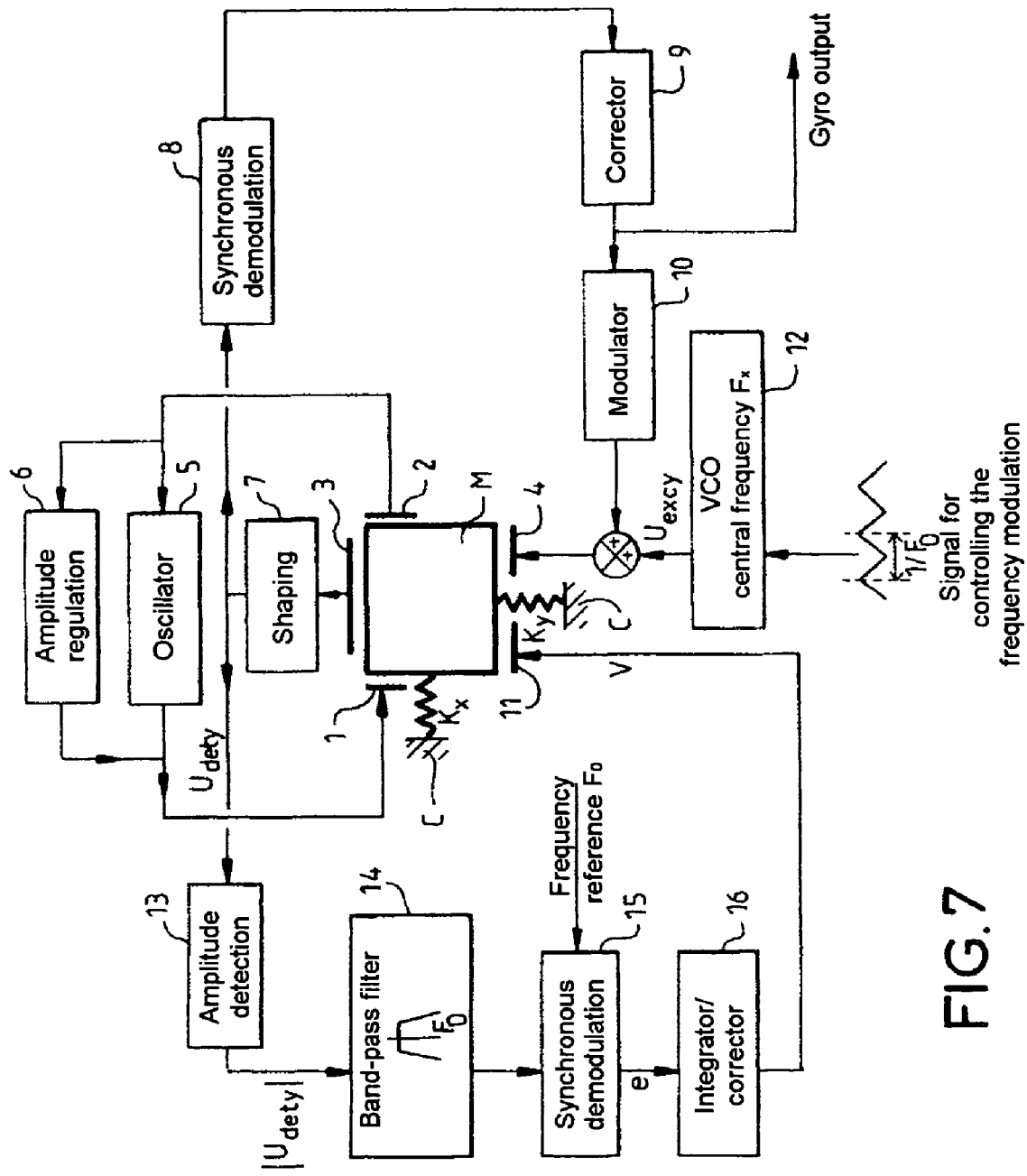
FIG. 7 shows schematically the necessary main components relating to a signal mass in an example of a gyroscope according to the invention.

A gyroscope according to the invention will now be described. It comprises, as shown in FIG. 7, in addition to the elements described in relation to FIG. 2 and identified by the same references, a signal generator 12 for generating a signal that disturbs the vibration of the mass along y, connected to the mass M, and a feedback control loop for slaving the resonant frequency $F_y$ to the frequency $F_x$.

The disturbing force is generated by applying, to the y excitation electrode 4, by means of the generator 12 such as a VCO (voltage-controlled oscillator) connected to the y excitation loop, a disturbing voltage $U_{ex,y}$ frequency-modulated about the central frequency $F_x$ at the frequency $F_0$. The control signal from the oscillator is that shown in FIG. 4a).

The feedback control loop comprises the following elements.

The amplitude of the signal $U_{det,y}$ is recovered by means of an amplitude detector 13 after a shaping device 7 has shaped the signal coming from the detection electrodes 3. This detector 13 delivers $|U_{det,y}|$ and, after the signal $|U_{det,y}|$ has passed through an $F_0$-centered narrow band-pass filter 14 and then through an $F_0$ reference frequency demodulator 15, an error signal e is produced, which becomes zero when the frequency $F_y$ becomes equal to $F_x$.

After integration by means of an integrator/corrector 16, this error signal may control a voltage V on the stiffness electrode 11 that modifies the stiffness $K_y$ and therefore the frequency $F_y$.

The natural frequency $F_y$ of the mass M along y is therefore properly slaved to the natural frequency $F_x$ along x.

In the case described above, a disturbing force was applied to the mass along y by modulating the frequency of the excitation signal.

Rather than modulating the excitation frequency, it is possible, according to a variant of the invention, to modulate the amplitude of the electrostatic stiffness.

In this case, a voltage $V+v_0\sin(2\pi F_0 t)$ is applied to the stiffness electrode 11. The effect on the detection signal is then equivalent to that obtained by modulating the frequency of the excitation signal.

Figure 8:
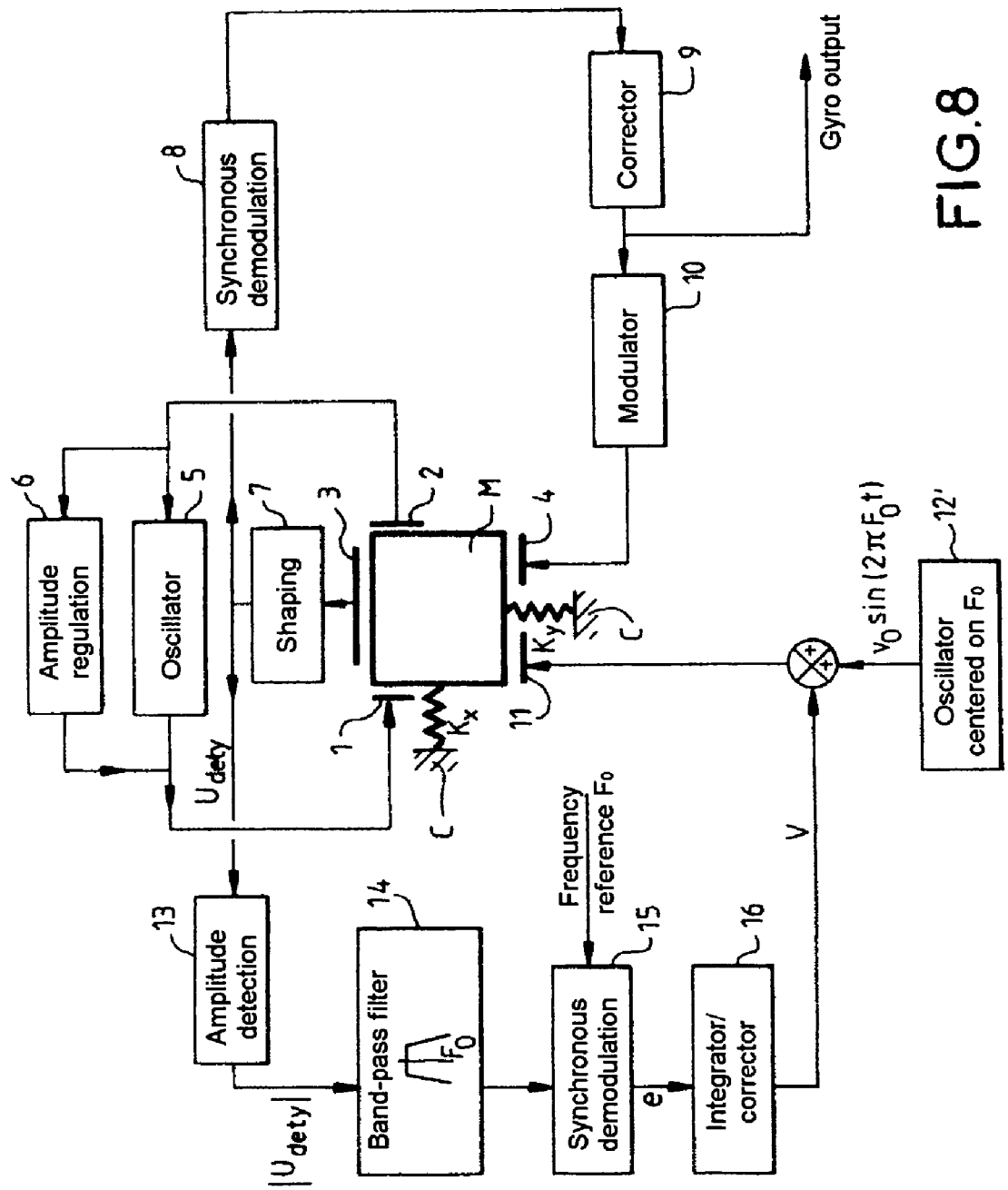
FIG. 8 shows schematically the necessary main components relating to a signal mass of another example of a gyroscope according to the invention.

FIG. 8 shows the gyroscope corresponding to this variant. The disturbing force is then generated by applying, to the y stiffness electrode 11, the disturbing voltage $v_0\sin(2\pi F_0 t)$ generated by an oscillator (12') centered on the frequency $F_0$, connected to the feedback control loop for slaving $F_y$ to $F_x$. The feedback control loop is the same as that described in relation to FIG. 7.

The various elements described in relation to FIGS. 2, 7 and 8 may of course be produced in analogue or digital technology.

The vibrating gyroscope according to the invention may have a plane or three-dimensional structure. It may or may not be micromachined.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A gyroscope comprising at least one mass capable of vibrating along an x axis at a resonant excitation frequency $F_x$ and capable of vibrating along axis perpendicular to the x axis, at a resonant detection frequency $F_y$, under the effect of the Coriolis force generated by a rotation about a z axis perpendicular to the x and y axes, comprising connected to the mass, a signal generator for generating a signal that disturbs the vibration of the mass along the y-axis, and a feedback control loop for controlling the resonant frequency $F_y$ so that $F_y$ is equal or practically equal to $F_x$ throughout the duration of use of the gyroscope, the feedback control loop comprising:

means for modifying the resonant detection frequency $F_y$;

means for detecting the variation induced by the disturbing signal on the vibration of the mass along the y-axis, an error signal e representative of the difference between $F_x$ and $F_y$ being deduced from the variation induced by the disturbing signal; and control means for controlling the $F_y$-modifying means, the control being established on the basis of the error signal e.

2. The gyroscope as claimed in claim 1, wherein the disturbing-signal generator is connected to the mass via the $F_y$-modifying means.

3. The gyroscope as claimed in claim 1, wherein the disturbing-signal generator is connected to the $F_y$-modifying means via the feedback control loop.

4. The gyroscope as claimed in claim 2 wherein the disturbing-signal generator is an oscillator of predetermined reference frequency $F_0$.

5. The gyroscope as claimed in claim 2, wherein, since the gyroscope has a predetermined bandwidth, the disturbing signal is a periodic signal of frequency $F_0$, where $F_0$ is above the bandwidth of the gyroscope but below $F_x$.

6. The gyroscope as claimed in claim 1, comprising: excitation means for exciting the mass along the y-axis with the aim of counterbalancing the vibration along the y-axis generated by the Coriolis force, wherein the disturbing-signal generator is connected to the mass via the excitation means.

7. The gyroscope as claimed in claim 6, comprising: the y-axis excitation loop and wherein the disturbing-signal generator is connected to the excitation means via the y-axis excitation loop.

8. The gyroscope as claimed in claim 6, wherein the disturbing-signal generator is a voltage-controlled oscillator.

9. The gyroscope as claimed in claim 6, wherein, since the gyroscope has a predetermined bandwidth, the disturbing signal is a periodic signal, $\Delta F$ being equal to about 10% of $F_x$, the frequency of which varies between $F_x - \Delta F$ and $F_x + \Delta F$ according to a frequency $F_0$, where $F_0$ is above the bandwidth of the gyroscope but below $F_x$.

10. The gyroscope as claimed in claim 6, wherein the excitation means comprise electrodes.

11. The gyroscope as claimed in claim 4, wherein the feedback control loop further comprises:
connected in series, means for shaping the signal output by the detection means, an amplitude detection device, an $F_0$-centered band-pass filter, a synchronous demodulator for synchronizing with the reference frequency $F_0$, and an integrator/corrector that is connected to the means for modifying the frequency $F_y$.

12. The gyroscope as claimed in claim 1, wherein, since the mass is connected to a rigid frame by means of springs along x and y, of respective stiffness $K_x$ and $K_y$, the means for modifying the resonant frequency $F_y$ comprise electrodes for controlling the stiffness $K_y$.

13. The gyroscope as claimed in claim 1, wherein the means for detecting the variation induced in the vibration of the mass along the y-axes comprise electrodes.

14. The gyroscope as claimed in claim 1, wherein, when the disturbing signal is a periodic signal of predetermined frequency $F_0$, the disturbing signal is a sinusoidal or triangular signal.

15. The gyroscope as claimed in claim 1, wherein the gyroscope is a micromachined gyroscope having a plane structure and in that the x and y axes lie in the plane of the plane structure.

16. The gyroscope as claimed in claim 1, wherein the gyroscope is a micromachined gyroscope having a plane structure and in that the x axis lies in the plane of the plane structure and the y axis does not lie in the plane of the plane structure.

17. The gyroscope as claimed in claim 1, wherein the gyroscope has a three-dimensional structure.

* * * * *